(12) United States Patent
Gustavsson et al.

(10) Patent No.: US 9,205,730 B2
(45) Date of Patent: *Dec. 8, 2015

(54) CABRIOLET SOFT TOP
(71) Applicant: GM GLOBAL TECHNOLOGY OPERATIONS LLC, Detroit, MI (US)
(72) Inventors: Roger Gustavsson, Vaenersgorg (SE); Magnus Olsson, Trollhaettan (SE)
(73) Assignee: GM GLOBAL TECHNOLOGY OPERATIONS LLC, Detroit, MI (US)
( * ) Notice: Subject to any disclaimer, the term of this patent is extended or adjusted under 35 U.S.C. 154(b) by 116 days.

This patent is subject to a terminal disclaimer.

(21) Appl. No.: 13/925,125
(22) Filed: Jun. 24, 2013

(65) Prior Publication Data
US 2013/0285407 A1    Oct. 31, 2013

Related U.S. Application Data
(63) Continuation of application No. 12/062,276, filed on Apr. 3, 2008, now Pat. No. 8,486,846.

(30) Foreign Application Priority Data
Apr. 5, 2007  (EP) .................................... 07007139

(51) Int. Cl.
*B32B 27/02* (2006.01)
*B32B 27/04* (2006.01)
(Continued)

(52) U.S. Cl.
CPC .............. *B60J 7/1226* (2013.01); *B32B 27/12* (2013.01); *B60J 7/1291* (2013.01); *B32B 2260/021* (2013.01); *B32B 2260/046* (2013.01); *Y10T 442/2066* (2015.04); *Y10T 442/259* (2015.04);
(Continued)

(58) Field of Classification Search
CPC .......... B60J 7/102; B60J 3/007; B60J 7/1265; B60J 7/1226; B32B 27/12; B32B 17/04; B32B 17/10633; B32B 17/10678; B32B 27/18; B32B 7/02; B32B 2260/021; B32B 2260/046; B32B 2305/07; B32B 2305/08; B32B 2037/416; B32B 2307/56; B32B 2307/71
USPC .......... 296/107.01, 901.01, 98; 442/131, 132, 442/218
See application file for complete search history.

(56) References Cited

U.S. PATENT DOCUMENTS 4,121,870 A * 10/1978 Oakey ........................... 296/215
4,217,970 A    8/1980 Chika
(Continued)

FOREIGN PATENT DOCUMENTS

DE    19926420 A1    12/2000
EP    0284931 A1    10/1988

OTHER PUBLICATIONS

European Patent Office, European Patent Search Report for Application No. 07007139.4, dated Nov. 12, 2007.
(Continued)

*Primary Examiner* — Jennifer A Steele
(74) *Attorney, Agent, or Firm* — Ingrassia Fisher & Lorenz PC

(57) ABSTRACT

A soft top is provided for a cabriolet. The soft top includes, but is not limited to, a monofilament warp thread and a monofilament weft thread. The soft top also includes, but is not limited to, a filling material substantially filling the interstices between the monofilament warp thread and the monofilament weft thread to form a substantially translucent fabric.

19 Claims, 3 Drawing Sheets

(51) Int. Cl.
*B60J 7/12* (2006.01)
*B32B 27/12* (2006.01)

(52) U.S. Cl.
CPC ...... *Y10T 442/2598* (2015.04); *Y10T 442/3301* (2015.04); *Y10T 442/3317* (2015.04)

(56) References Cited

U.S. PATENT DOCUMENTS

| | | | |
|---|---|---|---|
| 4,444,822 A * | 4/1984 | Doyle et al. | 428/109 |
| 4,587,159 A * | 5/1986 | Gutek et al. | 442/71 |
| 4,639,034 A | 1/1987 | Amos | |
| 5,518,810 A | 5/1996 | Nishihara et al. | |
| 6,083,332 A * | 7/2000 | Abrams | 156/72 |
| 6,376,075 B1 * | 4/2002 | Tacke-Willemsen et al. | 428/402 |
| 6,910,729 B2 | 6/2005 | Kraenzler et al. | |
| 7,118,160 B2 | 10/2006 | Willard | |
| 2005/0285415 A1 * | 12/2005 | Metts et al. | 293/102 |
| 2006/0125158 A1 * | 6/2006 | Rouanet et al. | 264/621 |

OTHER PUBLICATIONS

UPSPTO, Non-final Office Action issued in U.S. Appl. No. 12/062,276, mailed Jun. 9, 2010.
Response to Non-final Office Action for U.S. Appl. No. 12/062,276, dated Aug. 31, 2010.
USPTO, Final Office Action issued in U.S. Appl. No. 12/062,276, mailed Nov. 8, 2010.
Response to Final Office Action for U.S. Appl. No. 12/062,276, dated Feb. 7, 2011.
USPTO, Non-final Office Action issued in U.S. Appl. No. 12/062,276, mailed Jul. 5, 2012.
Response to Non-final Office Action for U.S. Appl. No. 12/062,276, dated Sep. 11, 2012.
USPTO, Final Office Action issued in U.S. Appl. No. 12/062,276, dated Dec. 12, 2012.
Response to Final Office Action for U.S. Appl. No. 12/062,276, dated Mar. 12, 2013.

* cited by examiner

CABRIOLET SOFT TOP

CROSS-REFERENCE TO RELATED APPLICATION

This application is a continuation of U.S. patent application Ser. No. 12/062,276, filed Apr. 3, 2008, which claims priority to European Patent Application No. 07007139.4, filed Apr. 5, 2007, which is incorporated herein by reference in its entirety.

TECHNICAL FIELD

The present invention generally relates to a soft top more particularly a soft top for a cabriolet.

BACKGROUND

A soft top conventionally comprises a rainproof fabric layer which is supported by articulated struts of a roof support structure, so as to be movable between a deployed position in which it covers the passenger compartment of a vehicle and a retracted position in which it is folded down near the rear end of the passenger compartment.

In order for the driver to be able to look backwards, the soft top must have a rear window, which must be made of a material which is both clear and flexible. As pointed out in EP 0 284 931, such a window tends to become brittle with age, and may crack when the soft top is folded or unfolded, in particular since in the unfolded state it is subject to substantial tensile stress. Repairing the window is laborious and expensive. In order to reduce the risk of breakage, the rear window of a cabriolet soft top is usually smaller than that of a sedan model of the same vehicle type, so that the passenger compartment of the cabriolet tends to be dark and sombre when the soft top is deployed.

The present invention aims at providing a soft top for a cabriolet which makes the passenger compartment bright when deployed, allowing the passengers to experience an "open air feeling" even when driving with the soft top closed, and which is nevertheless resistant to aging. In addition, other desirable features and characteristics of the present invention will become apparent from the subsequent summary, detailed description and the appended claims, taken in conjunction with the accompanying drawings and this background.

SUMMARY

The foregoing goal and other goals are achieved according to the invention by a soft top for a cabriolet comprising at least a translucent rainproof fabric layer. Although the term "translucent" is used as a generic term here, including the notions "transparent" or "clear", such a fabric layer is will usually not be transparent or clear, but will scatter the light that passes through it. Nevertheless it will allow the passenger compartment to brighten considerably when compared to a conventional opaque tarpaulin. The fabric is by nature more resistant to aging and brittleness than a homogeneous flexible window, for although the fibres of the fabric might be made of the same material as a flexible window and might be expected to exhibit the same aging deterioration, fissures are confined to individual fibres and cannot grow into macroscopic cracks larger than the fabric mesh.

A suitable translucent fabric may be obtained using translucent thread. Such a thread may be a monofilament of conventional synthetic fibre material, such as polyester.

Alternatively, if the fabric layer has spaced-apart threads, spaces between the threads can be filled by a translucent filling material. Of course, the threads of such a fabric layer might be transparent themselves, too.

The rainproof fabric layer can be part of a multilayer structure, other layers serving different purposes such as reflecting infrared radiation, absorbing light, etc.

In particular, if the multilayer structure comprises a light-absorbing layer, a window may be formed in the light-absorbing layer for illuminating the passenger compartment.

For absorbing noise (e.g., of rain falling on the soft top) a gel layer may be provided in the multilayer structure.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
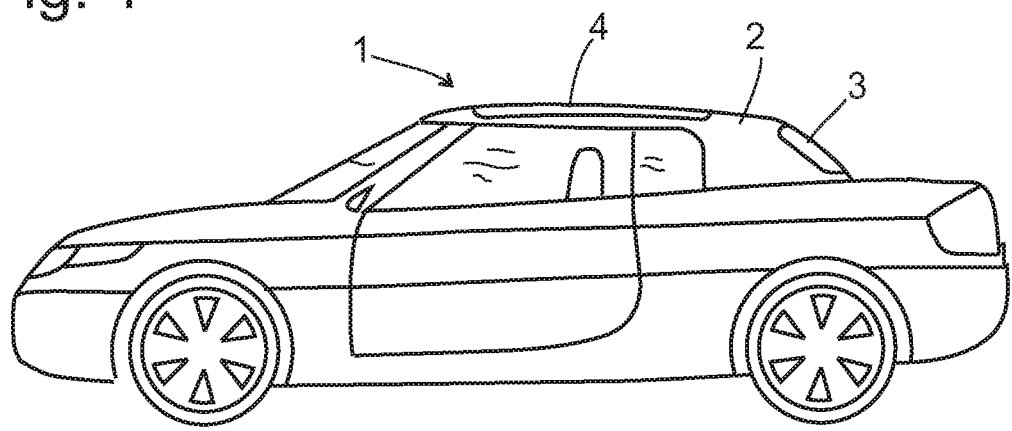
FIG. 1 is a side view of a cabriolet with an unfolded soft top.

FIG. 1 is a side view of a cabriolet according to the present invention, with a soft top 1 in an unfolded position. A multilayer tarpaulin 2 is conventionally supported by an articulated support structure so as to be movable between the unfolded position shown and a collapsed position in which the tarpaulin is folded near the rear end of the passenger compartment. A rear window 3 made of a transparent material is mounted in a cut-out of a rear slope of the tarpaulin 2. In a substantially horizontal roof portion of tarpaulin 2, a large translucent patch 4 is formed.

Figure 2:
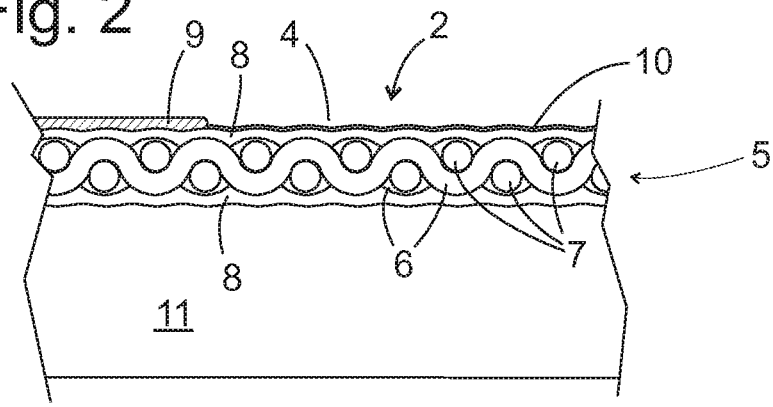
FIG. 2 is a cross section of a multilayer structure of a soft top according to a first embodiment of the invention.

FIG. 2 is a cross section of the roof portion of tarpaulin 2 according to a first embodiment of the invention. The tarpaulin comprises a fabric layer 5 formed of thick monofilaments as warp and weft threads (6, 7), respectively, embedded in a filling material 8. The monofilaments are formed of a rugged, translucent synthetic fibre material (e.g., polyester). The filling material 8 is applied, for example, by spraying or spreading a solution of a translucent resin on the fabric and evaporating the solvent, or by applying a film of a flexible translucent thermoplastic material to a side of the fabric and pressing the film into interstices of the fabric while heating it. The filling material makes the fabric rainproof by filling the interstices between the threads (6, 7), additionally it may improve translucency of the fabric layer 5 if its refractive index is close to that of the threads (6, 7). Eventually, multifilament threads might also be used for forming the fabric; in that case the filaments of the threads can be embedded in a filling material having a refractive index similar to that of the filaments in order to make the individual threads translucent.

All around the translucent patch 4, an opaque layer 9 is laminated on top of the fabric layer 5, so that supporting struts of the articulated support structure extending underneath are not visible from outside the vehicle.

At least within translucent patch 4, and possibly also on top of opaque layer 9, an IR-reflective layer or coating 10 is provided in order to prevent excessive heating of the passenger compartment in case of the sun shining on the closed soft top. As an alternative or additional means to prevent overheating, an electric fan, not shown, might be powered by photovoltaic elements formed on the tarpaulin 2 itself or at another appropriate location of the vehicle body.

At an inner side of fabric layer 5, a translucent gel layer 11 is provided. This gel layer 11 is the thickest layer of the tarpaulin 2, making up for the major portion of its weight. A suitable transparent gel on a polyurethane basis is available from Bayer AG under the trade name Technogel®. Due to the high weight conferred to the tarpaulin 2 by this gel layer 11, outside noise, especially the noise of rain falling on the tarpaulin 2, is efficiently dampened.

Figure 3:
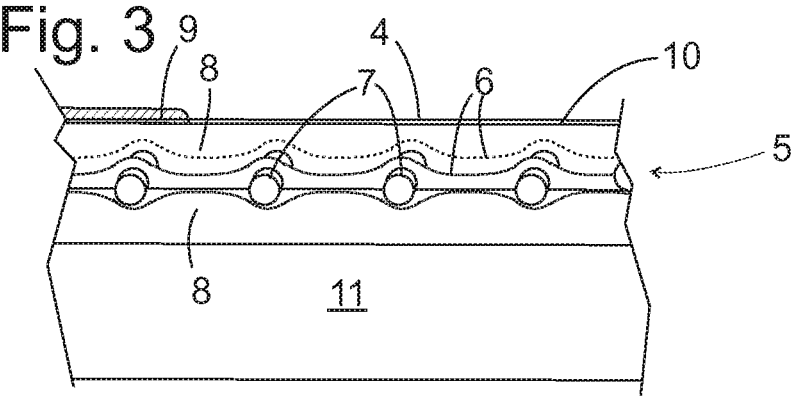
FIG. 3 is a cross section of a multilayer structure of a soft top according to a second embodiment of the invention.

FIG. 3 is a cross section of a tarpaulin 2 according to a second embodiment of the invention. In this embodiment, the fabric layer 5 comprises a wide-meshed, net-like fabric embedded in a layer of translucent filling material 8. Here, the fabric layer 5 may, for example, be obtained by laminating the fabric between two translucent films which merge to form the filling material layer. The threads (6, 7) of the fabric may, but need not, be translucent in this embodiment.

An opaque layer 9, an IR-reflective layer or coating 10 and a gel layer 11 are similar to those described above with respect to the first embodiment.

Figure 4:
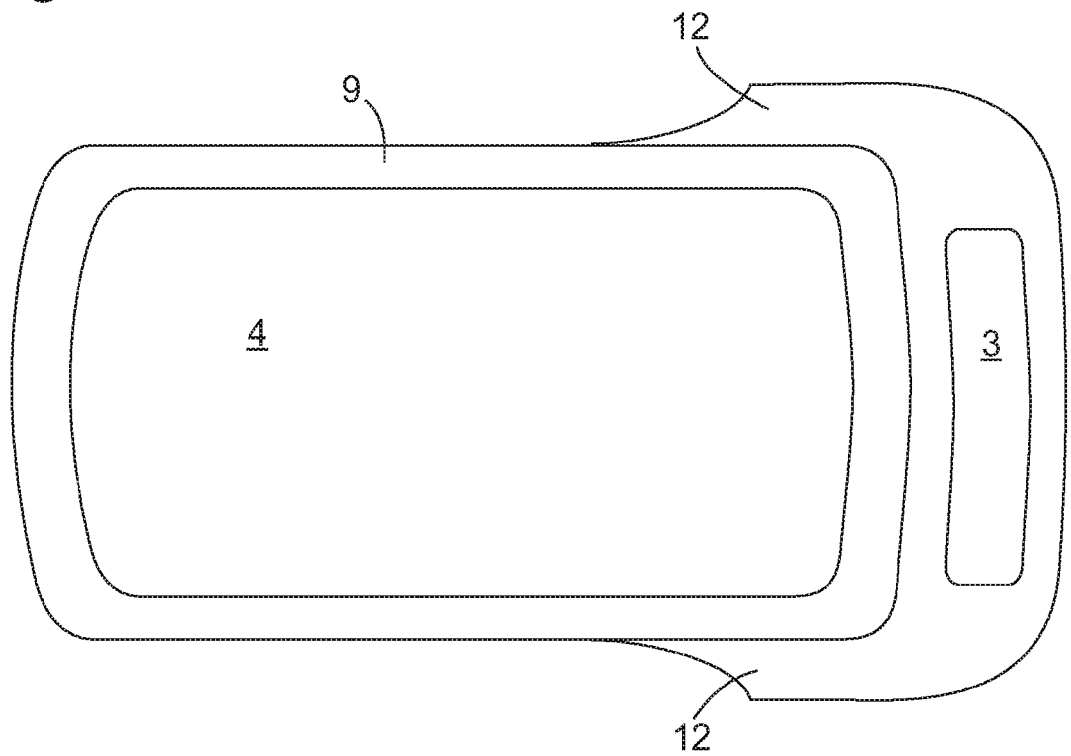
FIG. 4 is a top view of a first modification of the soft top.

FIG. 4 is a top view of the tarpaulin 2 according to the first or second embodiment, as described above. The roof portion is mainly formed of the transparent patch 4, extending above front and rear seats of the passenger compartment and surrounded by the opaque layer 9. The opaque layer 9 is also provided in C-column regions 12 and in the rear slope portion of the tarpaulin, surrounding rear window 3.

Figure 5:
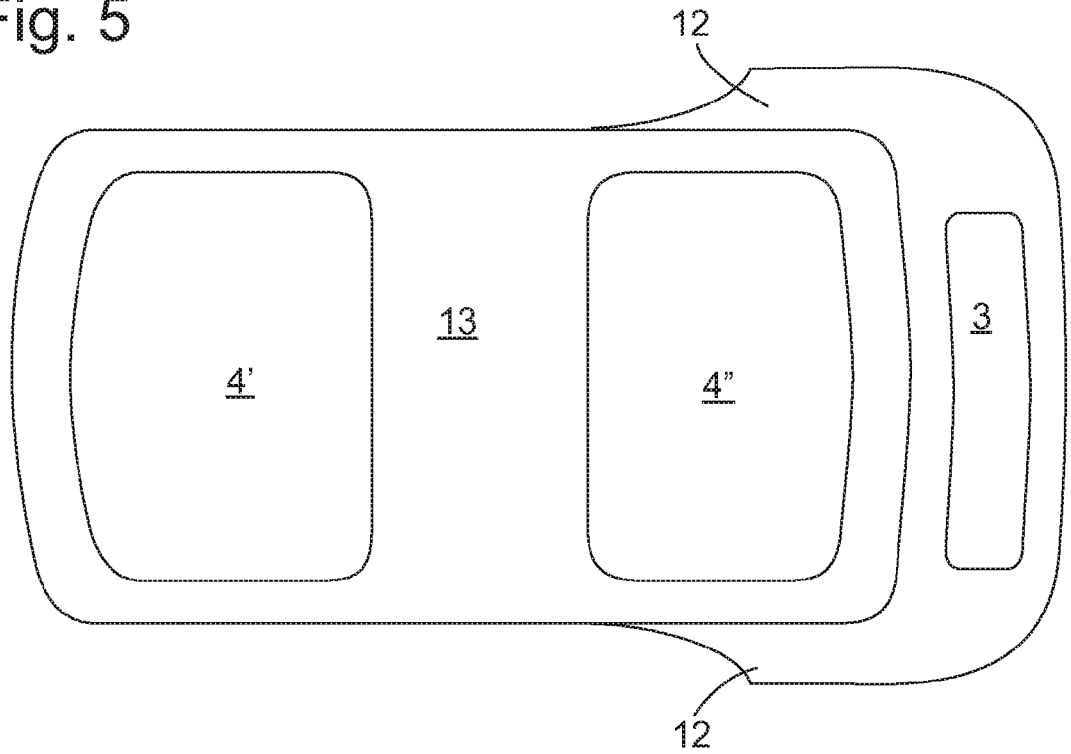
FIG. 5 is a top view of a second modification.

FIG. 5 is a top view of a modified version of tarpaulin 2. Here, two smaller transparent patches (4', 4") are formed in the roof portion of tarpaulin 2, one 4' above the front seats and the other 4" above the rear seats. A central strip 13 of the opaque layer conceals a crossbar of the roof support structure. If desired, only one of the two patches (4', 4") may be provided. A large variety of modified versions may be provided at low cost, such as by manufacturing a single basic version of the tarpaulin, without the opaque layer 9, and forming on this basic tarpaulin various opaque patterns (e.g., by screen printing).

Figure 6:
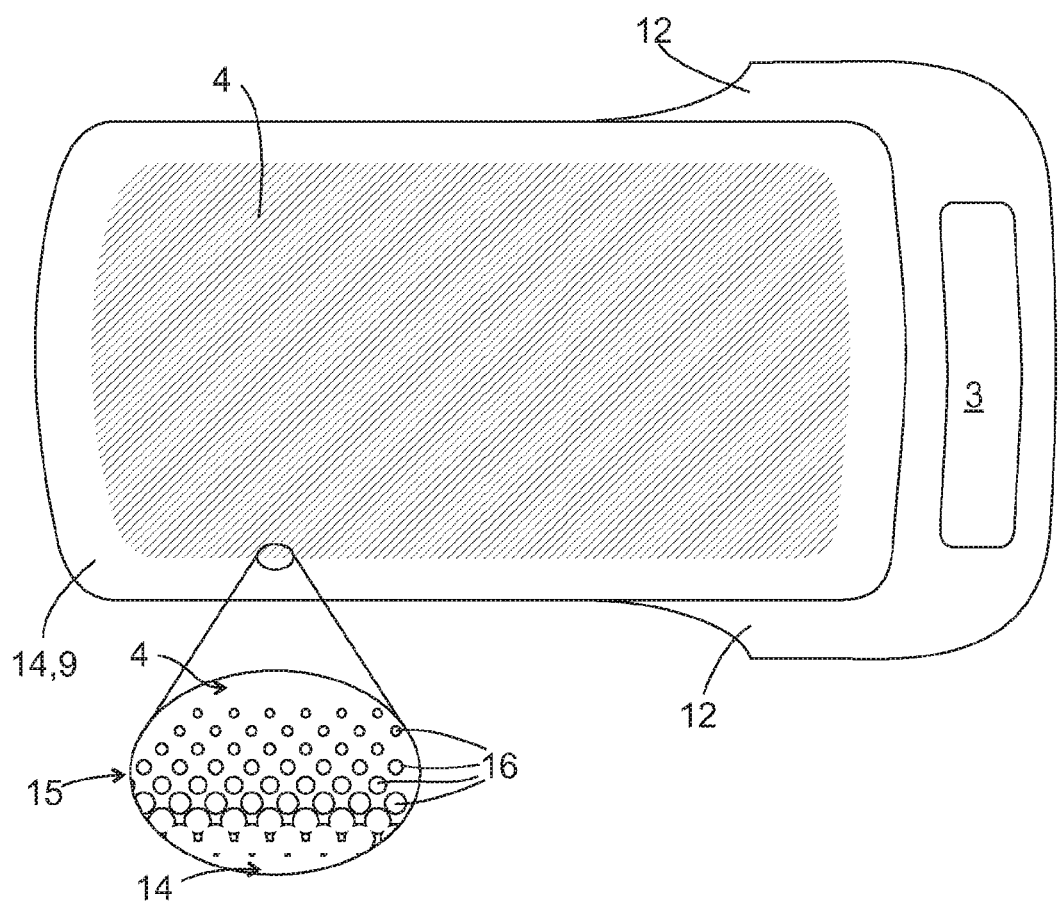
FIG. 6 is a top view of a third modification of the soft top.

In particular, printing techniques such as screen printing may be used for adjusting the degree of translucency of the tarpaulin. As shown in FIG. 6, between a border zone 14 of the tarpaulin 2, in which the opaque layer 9 is continuous, and the transparent patch 4, there may be a transition zone 15 in which the opaque layer is printed intermittently, here in the form of dots 16, the size of which gradually decreases from the border zone 14 towards the transparent patch 4.

In a similar way, according to a further modification, opaque dots may be distributed all over the transparent patch 4 itself, so that the occupants may feel like sitting in light shade. Since the printing pattern of the opaque layer 9 can easily be varied, versions of the soft top can be provided in which the size of the dots and, hence, the degree of shading is adapted to the climate of the country where the vehicle is expected to be driven.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A soft top for a cabriolet comprising:
a monofilament warp thread;
a monofilament weft thread; and
a translucent filling material substantially filling the interstices between the monofilament warp thread and the monofilament weft thread to form a substantially translucent fabric that is part of a multilayer structure including an infrared (IR) reflective layer laminated on top of the substantially translucent fabric and an opaque layer laminated on top of the substantially translucent fabric around a translucent patch;
wherein the monofilament warp thread and the monofilament weft thread are interwoven and embedded in the translucent filling material; and
wherein each of the monofilament warp thread and the monofilament weft thread comprise a translucent fibre material.

2. The soft top of claim 1, wherein the multilayer structure further comprises a light-absorbing layer.

3. The soft top of claim 2, wherein the light-absorbing layer comprises at least one window aperture.

4. The soft top of claim 1, wherein the multilayer structure further comprises a gel layer, configured to absorb sound.

5. The soft top of claim 1, wherein the soft top is configured to transition between an unfolded position and a collapsed position.

6. The soft top of claim 1, further comprising:
a substantially horizontal roof portion;
a rear slope portion having a rear window disposed therein;
wherein the opaque layer is laminated on top of the substantially translucent fabric around the translucent patch and surrounding the rear window; and
a translucent gel layer on an inner side of the substantially translucent fabric;
wherein the substantially translucent fabric provides the translucent patch in the substantially horizontal roof portion; and
wherein the translucent patch extends above front and rear seats of a passenger compartment of the cabriolet.

7. A cabriolet soft top comprising:
a substantially translucent fabric layer including:
a translucent warp thread, interwoven with a translucent weft thread;
a translucent filling material substantially filling the interstices between the translucent warp thread and the translucent weft thread;
an infrared-reflective layer overlying the substantially translucent fabric layer; and
an opaque layer laminated on top of the substantially translucent fabric layer to define a translucent patch comprised of the substantially translucent fabric layer.

8. The cabriolet soft top of claim 7, further comprising a gel layer situated at an inner side of the substantially translucent fabric layer, wherein the gel layer is configured to dampen outside noise.

9. The cabriolet soft top of claim 7, wherein the translucent warp thread and the translucent weft thread comprise a translucent synthetic fibre material.

10. The cabriolet soft top of claim 9, wherein translucent synthetic fibre material comprises polyester.

11. The cabriolet soft top of claim 7, wherein the translucent filling material comprises a refractive index equal to a refractive index of the translucent warp thread and the translucent weft thread.

12. The cabriolet soft top of claim 11, wherein the translucent warp thread and the translucent weft thread comprise multifilament threads.

13. The cabriolet soft top of claim 7, wherein the cabriolet soft top is configured to transition between an unfolded position and a collapsed position.

14. A cabriolet soft top comprising:
   a substantially horizontal roof portion;
   a rear slope portion having a rear window disposed therein;
   a substantially translucent fabric layer configured to transition between an unfolded position and a collapsed position, wherein the substantially translucent fabric layer provides a translucent patch in the substantially horizontal roof portion, and wherein the substantially translucent fabric layer further comprises:
      a translucent warp thread;
      a translucent weft thread;
      a translucent filling material substantially filling the interstices between the translucent warp thread and the translucent weft thread;
      an IR-reflective layer overlying the substantially translucent fabric layer;
      an opaque layer laminated on the substantially translucent fabric layer around the translucent patch and surrounding the rear window; and
      a translucent gel layer on an inner side of the substantially translucent fabric layer; and
   wherein the translucent patch extends above front and rear seats of a passenger compartment of the cabriolet.

15. The cabriolet soft top of claim 14, wherein translucent filling material is configured to render the substantially translucent fabric layer rainproof.

16. The cabriolet soft top of claim 14, wherein the translucent filling material comprises a refractive index equal to a refractive index of the translucent warp thread and the translucent weft thread.

17. The cabriolet soft top of claim 14, wherein the translucent warp thread and the translucent weft thread comprise a translucent synthetic fibre material.

18. The cabriolet soft top of claim 17, wherein translucent synthetic fibre material comprises polyester.

19. The cabriolet soft top of claim 14, wherein the translucent gel layer is configured to dampen outside noise.

* * * * *